(12) United States Patent
Campbell et al.

(10) Patent No.: US 6,652,919 B1
(45) Date of Patent: Nov. 25, 2003

(54) HIGHLY SCRATCH-RESISTANT MULTILAYER COAT, METHOD FOR PRODUCING AND USE OF THE SAME

(75) Inventors: Donald H. Campbell, Hartland Township, MI (US); Hubert Baumgart, Münster (DE); Thomas Farwick, Billerbeck (DE); Ulrike Röckrath, Senden (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 09/890,760

(22) PCT Filed: Feb. 24, 2000

(86) PCT No.: PCT/EP00/00837

§ 371 (c)(1),
(2), (4) Date: Aug. 2, 2001

(87) PCT Pub. No.: WO00/50178

PCT Pub. Date: Aug. 31, 2000

(30) Foreign Application Priority Data

Feb. 25, 1999 (DE) .......................................... 199 08 001

(51) Int. Cl.$^7$ ................................................ C08G 18/10
(52) U.S. Cl. .................... 427/407.1; 427/409; 427/379; 428/423.1
(58) Field of Search .............................. 427/407.1, 409, 427/379; 428/423.1

(56) References Cited

U.S. PATENT DOCUMENTS

| | | | |
|---|---|---|---|
| 2,979,514 A | 1/1961 | O'Brien et al. .......... 260/340.2 |
| 3,479,328 A | 11/1969 | Nordstrom ................. 260/86.1 |
| 3,639,147 A | 2/1972 | Benefiel et al. ............... 117/73 |
| 3,674,838 A | 7/1972 | Nordstrom .................. 260/482 |
| 3,953,644 A | 4/1976 | Camelon et al. ............ 428/220 |
| 4,126,747 A | 11/1978 | Cowherd, III et al. ...... 520/166 |
| 4,220,679 A | 9/1980 | Backhouse .................. 427/401 |
| 4,279,833 A | 7/1981 | Culbertson et al. ......... 260/464 |
| 4,301,257 A | 11/1981 | Zengel et al. ............... 525/329 |
| 4,340,497 A | 7/1982 | Knopf ..................... 252/188.3 |
| 4,444,954 A | 4/1984 | Mels et al. .................. 525/124 |
| 4,489,135 A | 12/1984 | Drexler et al. ............ 428/423.1 |
| 4,558,090 A | 12/1985 | Drexler et al. .............. 524/591 |
| 4,576,868 A | 3/1986 | Poth et al. ................ 428/423.1 |
| 4,675,234 A | 6/1987 | Sachs et al. ................. 428/328 |
| 4,710,542 A | 12/1987 | Forgione et al. ............ 525/127 |
| 4,719,132 A | 1/1988 | Porter, Jr. ................... 427/409 |
| 4,730,020 A | 3/1988 | Wilfinger et al. ........... 524/555 |
| 4,758,632 A | 7/1988 | Parekh et al. ............... 525/383 |
| 4,851,460 A | 7/1989 | Stranghöner et al. ....... 523/407 |
| 4,874,522 A | 10/1989 | Okamoto et al. ........... 210/645 |
| 4,880,867 A | 11/1989 | Gobel et al. ................. 524/507 |
| 4,939,213 A | 7/1990 | Jacobs, III et al. ...... 525/329.9 |
| 4,945,128 A | 7/1990 | Hille et al. .................. 524/591 |
| 4,981,759 A | 1/1991 | Nakatani et al. ............ 428/626 |
| 5,028,639 A | 7/1991 | Treutlein et al. ............ 523/200 |
| 5,075,372 A | 12/1991 | Hille et al. .................. 524/839 |
| 5,084,541 A | 1/1992 | Jacobs, III et al. ........... 528/45 |
| 5,334,420 A | 8/1994 | Hartung et al. ........... 427/407.1 |
| 5,342,882 A | 8/1994 | Göbel et al. ................. 524/832 |
| 5,356,669 A | 10/1994 | Rehfuss et al. .............. 427/407 |
| 5,368,944 A | 11/1994 | Hartung et al. ........... 428/423.1 |
| 5,370,910 A | 12/1994 | Hille et al. ............... 427/407.1 |
| 5,384,367 A | * 1/1995 | Swarup et al. |
| 5,416,136 A | 5/1995 | Konzmann et al. ......... 523/414 |
| 5,418,264 A | 5/1995 | Obloh et al. ................ 523/414 |
| 5,425,970 A | 6/1995 | Lahrmann et al. .......... 427/493 |
| 5,474,811 A | 12/1995 | Rehfuss et al. ........... 427/407.1 |
| 5,486,384 A | 1/1996 | Bastian et al. .............. 427/493 |
| 5,512,322 A | 4/1996 | Hille et al. ............... 427/407.1 |
| 5,552,496 A | 9/1996 | Vogt-Birnbrich et al. ... 525/440 |
| 5,569,705 A | 10/1996 | Vogt-Birnbrich et al. ... 524/591 |
| 5,571,861 A | 11/1996 | Klein et al. ................. 524/591 |
| 5,601,878 A | 2/1997 | Kranig et al. ............... 427/386 |
| 5,601,880 A | 2/1997 | Schwarte et al. ......... 427/407.1 |
| 5,605,965 A | 2/1997 | Rehfuss et al. ............. 525/100 |
| 5,623,016 A | 4/1997 | Klein et al. ................. 524/591 |
| 5,639,554 A | 6/1997 | McGee et al. ........... 428/423.1 |
| 5,654,391 A | 8/1997 | Göbel et al. .................. 528/71 |

(List continued on next page.)

FOREIGN PATENT DOCUMENTS

| | | | |
|---|---|---|---|
| CA | 2073115 | 7/1992 | ......... C09D/175/14 |
| CA | 2102169 | 11/1993 | ......... C09D/133/00 |
| CA | 2102170 | 11/1993 | ......... C09D/133/00 |

(List continued on next page.)

OTHER PUBLICATIONS

English Abstract provided with the International Publication for WO 99/08808.

*Primary Examiner*—Rachel Gorr

(57) ABSTRACT

A highly scratch-resistant multicoat paint system on a primed or unprimed substrate, comprising above one another in this order (A) a basecoat, (B) a first clearcoat as intermediate coat, and (C) a second clearcoat as the topmost coat, wherein the second clearcoat (C) is producible from a coating coating material (C) comprising (C1) at least one oligomer and/or polymer containing at least one pendant carbamate and/or allophanate group (c11), especially carbamate group (c11), of the formula:

—O—(CO)—$NH_2$—O—(CO)—NH—(CO)—$NH_2$ and (C2) at least one crosslinking agent containing at least two functional groups (c21) which undergo crosslinking reactions with the carbamate group and/or allophanate group (c11);

and also a process for producing highly scratch-resistant multicoat systems.

29 Claims, No Drawings

U.S. PATENT DOCUMENTS

| | | | |
|---|---|---|---|
| 5,658,617 A | 8/1997 | Göbel et al. | 427/372.2 |
| 5,686,531 A | 11/1997 | Engelke et al. | 525/111 |
| 5,691,419 A | 11/1997 | Engelke et al. | 525/208 |
| 5,691,425 A | 11/1997 | Klein et al. | 525/455 |
| 5,716,678 A | 2/1998 | Röckrath et al. | 427/407.1 |
| 5,760,128 A | 6/1998 | Baltus et al. | 524/591 |
| 5,965,213 A | 10/1999 | Sacharski et al. | 427/475 |
| 5,972,422 A * | 10/1999 | Harmon | |
| 6,001,424 A | 12/1999 | Lettmann et al. | 427/407.1 |
| 6,001,915 A | 12/1999 | Schwarte et al. | 524/457 |

FOREIGN PATENT DOCUMENTS

| | | | |
|---|---|---|---|
| DE | 39 03804 | 8/1990 | B05D/7/26 |
| DE | 432092 | 2/1995 | C09D/175/04 |
| EP | 0 038 127 A1 | 3/1981 | B05D/7/26 |
| EP | 0 069 936 | 1/1983 | C09D/3/00 |
| EP | 0 245 700 A2 | 4/1987 | C07D/251/54 |
| EP | 0 249 201 A2 | 6/1987 | C09D/3/58 |
| EP | 0 276 501 A2 | 9/1987 | C11D/1/42 |
| EP | 0 320 552 A1 | 12/1987 | B05D/7/26 |
| EP | 0 299 148 A2 | 4/1988 | C08G/18/08 |
| EP | 0 354 261 A1 | 8/1988 | C08G/18/50 |
| EP | 297 576 | 1/1989 | C09D/3/72 |
| EP | 0 394 737 A1 | 4/1990 | C09D/175/06 |
| EP | 0 401 565 A1 | 5/1990 | C09D/5/02 |
| EP | 394 737 | 10/1990 | C09D/175/06 |
| EP | 0 424 705 A2 | 10/1990 | C08F/283/00 |
| EP | WO92/17546 | 10/1992 | C08L/75/04 |
| EP | 0 590 484 A1 | 9/1993 | C08G/18/08 |
| EP | 0 594 068 A1 | 10/1993 | C09D/201/02 |
| EP | 0 594 142 A1 | 10/1993 | C08L/57/12 |
| EP | 0 594 071 A1 | 4/1994 | C09D/201/02 |
| EP | 0 624 577 A1 | 5/1994 | C07D/251/70 |
| EP | WO94/10211 | 5/1994 | C08F/8/30 |
| EP | WO94/10212 | 5/1994 | C08F/8/30 |
| EP | WO94/10213 | 5/1994 | C08F/8/30 |
| EP | 708 788 | 6/1994 | |
| EP | WO97/12945 | 4/1997 | C09D/5/04 |
| EP | 0 832 947 | 9/1997 | C09D/7/12 |
| EP | WO97/49745 | 12/1997 | C08G/18/08 |
| EP | WO97/49747 | 12/1997 | C08G/18/75 |
| EP | WO 99/08808 | 2/1999 | B05D/7/00 |
| EP | WO 99/57207 | 11/1999 | C09D/5/00 |
| GB | 20 12 191 A | 12/1978 | C05D/1/36 |
| WO | WO 9422968 | 10/1994 | C09D/133/06 |

* cited by examiner

HIGHLY SCRATCH-RESISTANT MULTILAYER COAT, METHOD FOR PRODUCING AND USE OF THE SAME

The present invention relates to a novel, highly scratch-resistant multicoat paint system comprising a multicoat clearcoat. The present invention further relates to a novel process for producing highly scratch-resistant multicoat paint systems which is based on the wet-on-wet technique. The present invention relates not least to the use of the novel, highly scratch-resistant multicoat paint systems particularly in automotive OEM finishing and in industrial coating.

The requirements imposed on the resistance of topcoats which are exposed to weathering, especially insolation and acid rain, and also, even more frequently, to mechanical stress, especially that produced by wash-brush cleaning installations, are becoming increasingly more stringent. This is so most particularly for vehicle finishes, which have to meet these requirements while also satisfying very high optical demands regarding gloss, surface smoothness, and color.

To date this problem has been solved by applying to the substrates a multicoat paint system which, in accordance with the heightened environmental compatibility requirements, is constructed substantially from aqueous coating materials. In the case of metal substrates, this multicoat paint system is conventionally produced from an aqueous electrocoat material, a water-based primer-surfacer, an aqueous basecoat material, and a solventborne clearcoat material. The electrocoat material and the water-based primer-surfacer are each baked following their application, and then constitute the primer. The aqueous basecoat material is applied atop said primer and the system is subjected to interim drying. Over this coat, which is not yet fully cured, the clearcoat material is applied, after which the two coats are cured together (wet-on-wet technique). Where the substrates used comprise plastics, water-based primers are conventionally employed in place of the electrocoat materials.

The wet-on-wet technique for producing multicoat topcoat systems is described, for example, in the patents U.S. Pat. No. 3,639,147, DE-A-33 33 072, DE-A-38 14 853, GB-A-2 012 191, U.S. Pat. No. 3,953,644, EP-A-0 260 447, DE-A-39 03 804, EP-A-0 320 552, DE-A-36 28 124, U.S. Pat. No. 4,719,132, EP-A-0 297 576, EP-A-0 069 936, EP-A-0 089 497, EP-A-0 195 931, EP-A-0 228 003, EP-A-0 038 127, and DE-A-28 18 100.

The optical or visual appearance and the weather stability are primarily the responsibility of the two topmost coats of the multicoat paint systems. Thus, the aqueous basecoat gives the multicoat paint system its color and/or optical effects such as metallic effects or interference effects, while the clearcoat provides not only scratch and etch resistance, i.e., resistance to damaging environmental substances, but also the appearance qualities, i.e., the gloss, brilliance, and evenness. In this system, aqueous basecoat material and clearcoat material must be very precisely matched to one another in order to produce a system having the desired advantageous profile of properties.

Aqueous basecoat materials and the corresponding paint systems which substantially meet these requirements are known from the patents EP-A-0 089 497, EP-A-0 256 540, EP-A-0 260 447, EP-A-0 297 576, WO 96/12747, EP-A-0 523 610, EP-A-0 228 003, EP-A-0 397 806, EP-A-0 574 417, EP-A-0 531 510, EP-A-0 581 211, EP-A-0 708 788, EP-A-0 593 454, DE-A-43 28 092, EP-A-0 299 148, EP-A-0 394 737, EP-A-0 590 484, EP-A-0 234 362, EP-A-0 234 361, EP-A-0 543 817, WO 95/14721, EP-A-0 521 928, EP-A-0 522 420, EP-A-0 522 419, EP-A-0 649 865, EP-A-0 536 712, EP-A-0 596 460, EP-A-0 596 461, EP-A-0 584 818, EP-A-0 669 356, EP-A-0 634 431, EP-A-0 678 536, EP-A-0 354 261, EP-A-0 424 705, WO 97/49745, WO 97/49747, and EP-A-0 401 565.

These aqueous basecoat materials principally comprise anionically stabilized polyurethanes, with polyfunctional amines and/or amino alcohols, such as triethylamine, methylethanolamine and/or dimethylethanolamine, being used as neutralizing agents.

The solventborne clearcoat materials are commonly one-component (1K), two-component (2K) or multi-component (3K, 4K) clearcoat materials such as are described, for example, in the patents EP-A-0 604 992, WO 94/22969, EP-A-0 596 460, and WO 92/22615.

Although this route leads to multicoat paint systems that satisfy the optical requirements, the one-component (1K) clearcoat often lack sufficient weathering stability, while the two-component (2K) or multi-component (3K, 4K) clearcoats are often not sufficiently abrasion-resistant.

Moreover, there has been no lack of attempts to master these problems through the use of powder clearcoat materials, such as are known, for example, from the German patent DE-A-42 22 194, powder slurry clearcoat materials, such as are known, for example, from the German patent DE-A-196 13 547, or UV-curable clearcoat materials, such as are described, for example, in the patents EP-A-0 540 884, EP-A-0 568 967, and U.S. Pat. No. 4,675,234. In certain circumstances, however, other disadvantages are then introduced, such as a not entirely satisfactory intercoat adhesion, without the problems of scratch resistance or of etch resistance being fully solved.

The patents U.S. Pat. No. 5,474,811, U.S. Pat. No. 5,356,669, U.S. Pat. No. 5,605,965, WO 94/10211, WO 94/10212, WO 94/10213, EP-A-0 594 068, EP-A-0 594 071, and EP-A-0 594 142 disclose coating materials which comprise at least one oligomer and/or polymer containing at least one pendant carbamate group of the formula

and at least one crosslinking agent containing at least two functional groups which undergo crosslinking reactions with the carbamate group. These known coating materials produce clearcoats which possess extremely high scratch resistance and etch resistance. Cross-linking agents principally employed are highly etherified melamine-formaldehyde resins. The cross-linking itself is catalyzed by acid, catalysts used preferably comprising strong protic acids, especially sulfonic acids, which as a general rule are blocked with amines.

However, these advantageous coating materials cannot be used together with the abovementioned aqueous basecoat materials to construct multicoat paint systems, since if this is done there are frequently surface defects in the clearcoat owing to the shrinkage effect known as wrinkling.

It is an object of the present invention to provide a novel multicoat paint system which no longer has the disadvantages of the prior art but which instead possesses not only an outstanding profile of optical properties and an outstanding appearance but also high scratch resistance and etch resistance, and in which surface defects no longer occur. A further object of the present invention was to provide a novel process for producing multicoat paint systems which, simply, safely, and reliably, produces the novel multicoat paint systems.

The invention accordingly provides the novel, highly scratch-resistant multicoat paint system on a primed or unprimed substrate, comprising

3

(A) a basecoat, (B) a first clearcoat as intermediate coat, and (C) a second clearcoat as the topmost coat lying above one another in that order, wherein the second clearcoat (C) is producible from a coating material (C) comprising (C1) at least one oligomer and/or polymer containing at least one pendant carbamate group and/or allophanate group (c11), especially carbamate group (c11), of the formula:

—O—(CO)—NH$_2$—O—(CO)—NH—(CO)—NH$_2$ and (C2) at least one crosslinking agent containing at least two functional groups (c21) which undergo crosslinking reactions with the carbamate group and/or allophanate group (c11).

In the text below, the novel, highly scratch-resistant multicoat paint system is referred to as the "multicoat system of the invention".

The invention also provides the novel process for producing a highly scratch-resistant multicoat paint system, comprising at least the following steps:

(I) applying a basecoat material (A) to a primed or unprimed substrate, (II) carrying out interim drying of the applied base-coat material (A), (III) applying a first clearcoat material (B), and (IV) together curing the films (A) and (B) applied in steps (I) and (III) (wet-on-wet technique), which comprises (V) applying to the clearcoat (B) cured in step (IV) a materially different second clearcoat (C) comprising (C1) at least one oligomer and/or polymer containing at least one pendant carbamate group and/or allophanate group (c11), especially carbamate group (c11), of the formulae:

—O—(CO)—NH$_2$—O—(CO)—NH—(CO)—NH$_2$ and (C2) at least one crosslinking agent containing at least two functional groups (c21) which undergo crosslinking reactions with the carbamate group and/or allophanate group;

and (VI) carrying out curing.

In the text below, the novel process for producing a highly scratch-resistant multicoat paint system is referred to for the sake of brevity as the "first process of the invention".

The present invention further provides the novel process for producing a highly scratch-resistant multicoat paint system, comprising at least the following steps:

(I) applying a basecoat material (A) to a primed or unprimed substrate, (II) carrying out interim drying of the applied basecoat (A), and (III) applying a first clearcoat material (B), which comprises (IV) carrying out interim drying of the applied clearcoat material (B) and (V) applying to the interim-dried clearcoat film (B) the materially different second clearcoat film (C), and then (VI) baking the films (A), (B) and (C) together.

4

In the light of the prior art it was surprising and unforeseeable for the skilled worker that the object on which the present invention is based could be achieved by means of the multicoat system of the invention and the process of the invention. A particular surprise was that there were no problems of intercoat adhesion despite the multicoat construction of the clearcoat.

The key constituent of the multicoat system of the invention is the second clearcoat (C).

It is producible from a coating material (C) comprising as a first essential component at least one oligomer and/or polymer (C1) containing at least one pendant carbamate group and/or allophanate group (c11), especially carbamate group (c11), of the formulae:

—O—(CO)—NH$_2$—O—(CO)—NH—(CO)—NH$_2$.

Suitable oligomers and/or polymers (C1) include in principle all customary and known oligomers or polymers. Examples of suitable oligomers and polymers are linear and/or branched and/or block, comb and/or random addition copolymers of ethylenically unsaturated monomers, especially poly(meth)acrylates and also polyesters, alkyds, polyurethanes, acrylated polyurethanes, acrylated polyesters, polylactones, polycarbonates, polyethers, epoxy resin-amine adducts, (meth)acrylate-diols, partially saponified polyvinyl esters or polyureas, of which the copolymers of ethylenically unsaturated monomers, especially poly (meth)acrylates, are particularly advantageous and are therefore used with particular preference.

The carbamate group (c11) may be introduced by incorporating monomers containing these groups (c11). Examples of suitable monomers of this kind are ethylenically unsaturated monomers which contain a carbamate group or an allophanate group (c11).

Examples of suitable ethylenically unsaturated monomers containing a carbamate group (c11) are described in the patents U.S. Pat. No. 3,479,328, U.S. Pat. No. 3,674,838, U.S. Pat. No. 4,126,747, U.S. Pat. No. 4,279,833, and U.S. Pat. No. 4,340,497.

Alternatively, the carbamate group (c11) may be introduced into the oligomers and/or polymers (C1) by means of polymer-analogous reactions. Examples of suitable methods of this kind are known from the patents U.S. Pat. No. 4,758,632, U.S. Pat. No. 4,301,257, and U.S. Pat. No. 2,979,514.

Examples of poly(meth)acrylates (C1) whose use is particularly preferred in accordance with the invention are known from the patents U.S. Pat. No. 5,474,811, U.S. Pat. No. 5,356,669, U.S. Pat. No. 5,605,965, WO 94/10211, WO 94/10212, WO 94/10213, EP-A-0 594 068, EP-A-0 594 071, and EP-A-0 594 142.

In order to introduce allophanate groups (c11), oligomers and polymers having at least two, preferably at least three, primary and/or secondary, but especially primary, hydroxyl groups are transallophanatized with alkyl and aryl allophanates at from 30 to 200° C., preferably from 50 to 160° C., with particular preference from 60 to 150° C., and in particular from 80 to 140° C. The reaction is conducted in solution or in bulk, preferably in solution. It is advisable to add customary and known inhibitors to the reaction mixture, such as trialkyl phosphites, especially triisodecyl phosphite. It is further advantageous to use customary and known transesterification catalysts such as tin compounds, especially dibutyltin dioxide.

Examples of suitable allophanates for use in accordance with the invention are methyl, ethyl, propyl, butyl, pentyl, and phenyl allophanate, of which methyl and ethyl allophanate are particularly advantageous and are therefore used with particular preference in accordance with the invention.

Oligomers and polymers suitable for use in accordance with the invention and having at least two, preferably at least three, primary and/or secondary, but especially primary, hydroxyl groups include preferably linear and/or branched and/or block, comb and/or random addition copolymers of ethylenically unsaturated monomers, especially poly(meth) acrylates and also polyesters, alkyds, polyurethanes, acrylated polyurethanes, acrylated polyesters, polylactones, polycarbonates, polyethers, epoxy resin-amine adducts, (meth)acrylate-diols, partially saponified polyvinyl esters, polyureas, oligomeric polyols obtainable by hydroformylation and subsequent hydrogenation from oligomers themselves obtained by metathesis reactions of acyclic monoolefins and cyclic monoolefins; or aliphatic polyols, of which the copolymers of ethylenically unsaturated monomers, especially the poly(meth)acrylates, are particularly advantageous and are therefore used with particular preference.

Besides the hydroxyl groups, the abovementioned oligomers and polymers may also include functional groups such as acryloyl, ether, amide, imide, thio, carbonate or epoxide groups.

The second essential component of the coating material (B) for use in accordance with the invention is the crosslinking agent (C2).

Examples of suitable crosslinking agents (C2) are amino resins, especially melamine-formaldehyde resins, polysiloxanes, compounds containing at least one cyclic carbonate group, and/or polyanhydrides, but in particular amino resins.

In this context it is possible to use any amino resin suitable for topcoat materials or transparent clearcoat materials, or a mixture of such amino resins (C2). Particularly suitable are the customary and known amino resins some of whose methylol and/or methoxymethyl groups have been defunctionalized by means of carbamate or allophanate groups. Crosslinking agents of this kind are described in the patents U.S. Pat. No. 4,710,542 and EP-B-0 245 700 and also in the article by B. Singh and coworkers, "Carbamylmethylated Melamines, Novel Crosslinkers for the Coatings Industry", in Advanced Organic Coatings Science and Technology Series, 1991, volume 13, pages 193 to 207.

Examples of suitable siloxanes (C2) are siloxanes containing at least one trialkoxy- or dialkoxysilane group such as trimethoxysiloxane.

An example of a suitable polyanhydride (C2) is polysuccinic anhydride.

As the further essential component the coating material (C) for use in accordance with the invention comprises at least one blocked or unblocked acid as crosslinking catalyst (C3).

Examples of suitable crosslinking catalysts (C3) are p-toluenesulfonic acid, dinonylnaphthalenedisulfonic acid, dodecylbenzenesulfonic acid, and acidic phosphates. Further examples of suitable crosslinking catalysts (C3) are disclosed in the patent U.S. Pat. No. 5,605,965. Examples of suitable blocking agents are amines.

The coating material (C) for use in accordance with the invention may comprise at least one compound (C4) containing at least one epoxide group. The compound in question is preferably an oligomer or polymer containing pendant epoxide groups. Examples of suitable oligomers or polymers come from the classes of polymer mentioned above. Particular preference is given to using poly(meth) acrylates containing pendant epoxide groups. The compounds (C4) may be employed advantageously in amounts of from 0.1 to 15, preferably from 0.5 to 10, with particular preference from 0.8 to 5, and in particular from 1 to 2% by weight, based on the solids content of the coating material (C).

The coating material (C) may further comprise customary and known solvents (C5) and/or additives (C6).

Examples of suitable solvents (C5) are esters such as butyl acetate or methyl octoate isomers (Exxate®) or aromatic solvent mixtures such as Solvesso®.

Examples of suitable additives (C6) are UV absorbers; free-radical scavengers; Theological agents; silicas; reactive and inert nanoparticles such as are described, for example, in patent EP-A-0 832 947; colloidal metal hydroxides having blocked isocyanate groups, such as are described, for example, in the patent EP-A-0 872 500; slip additives; polymerization inhibitors; defoamers; leveling agents or film-forming auxiliaries such as cellulose derivatives. What is important is that these additives (C6) do not adversely effect, but instead advantageously vary and improve, the transparency and other particular advantageous properties of the clear-coat (C). Further examples of suitable additives (C6) are disclosed in the patent U.S. Pat. No. 5,605,695.

The composition of the coating materials (C) for use in accordance with the invention, i.e., the quantitative relationship of their components, may vary widely and is guided by the profile of properties of the clearcoat (C) and by its harmonization with the profile of properties of the clearcoat (B). Using his or her knowledge of the art, with or without the assistance of simple preliminary tests, and possibly using the prior art as a guideline, the skilled worker is able to determine suitable compositions. In general it is advisable to choose the proportions disclosed in the patents U.S. Pat. No. 5,474,811, U.S. Pat. No. 5,356,669, U.S. Pat. No. 5,605,965, WO 94/10211, WO 94/10212, WO 94/10213, EP-A-0 594 068, EP-A-0 594 071, and EP-A-0 594 142.

The preparation of the coating material (C) from its components has no special features but instead takes place in a customary and known manner by mixing of the constituents in suitable mixing units such as dissolvers.

The second essential constituent of the multicoat system of the invention is the first clearcoat (B).

Coating materials suitable for its production in accordance with the invention include all coating materials (B) which can be applied by the wet-on-wet technique to basecoats (A), especially aqueous basecoats (A).

The first essential component of the coating material (B) is at least one binder (B1).

Examples of suitable binders (B1) come from the classes of polymer mentioned above and are described, for example, in the patents EP-A-0 832 947, EP-A-0 604 992, WO 94/22969, EP-A-0 596 460, WO 92/22615, DE-A-42 22 194, DE-A-196 13 547, EP-A-0 540 884, EP-A-0 568 967, and U.S. Pat. No. 4,675,234.

Where the coating materials (B) are to be curable additionally or solely with actinic radiation, especially UV radiation and/or electron beams, they include binders (B1) which are curable with actinic radiation.

Suitable such binders (B1) include in principle all oligomeric and polymeric compounds curable with actinic radiation, especially UV radiation and/or electron beams, such as are commonly used in the field of UV-curable or electron-beam-curable coating materials. These radiation-curable coating materials normally include at least one, preferably two or more, radiation-curable binder(s) (B1), based in particular on ethylenically unsaturated prepolymers and/or ethylenically unsaturated oligomers.

Examples of suitable radiation-curable binders (B1) are (meth)acryloyl-functional (meth)acrylic copolymers, poly-ether acrylates, polyester acrylates, unsaturated polyesters, epoxy acrylates, urethane acrylates, amino acrylates, melamine acrylates, silicone acrylates, and the corresponding methacrylates. It is preferred to use binders (B1) that are free from aromatic structural units. Preference is therefore given to using urethane (meth)acrylates and/or polyester (meth)acrylates, with particular preference aliphatic urethane acrylates.

The binders (B1) contain functional groups (b11) which undergo crosslinking reactions with the functional groups (b21) of the crosslinking agents (B2) (principle of complementary groups).

Examples of suitable functional groups (b11) are thio, amino, hydroxyl, carboxyl, epoxy or (meth)acrylate groups.

The second essential component of the coating material (B) is at least one crosslinking agent. Said agent contains functional groups (b21) which undergo cross-linking reactions with the functional groups (b11) of the binders (B1) (principle of complementary groups).

Examples of suitable functional groups (b21) are anhydride, carboxyl, epoxy, isocyanate, blocked isocyanate, urethane, methylol, methylol ether, siloxane, amino, hydroxyl or beta-hydroxyalkylamide groups or ethylenically unsaturated groups crosslinkable with actinic radiation.

Examples of suitable complementary reactive functional groups (b11) and (b21) for use in accordance with the invention that undergo crosslinking reactions are compiled in the following overview. In the overview, the variable R stands for an acyclic or cyclic aliphatic radical, an aromatic radical and/or an aromatic-aliphatic (araliphatic) radical; the variables $R^1$ and $R^2$ stand for identical or different aliphatic radicals or are linked with one another to form an aliphatic or heteroaliphatic ring.

| Overview: Examples of complementary functional groups (b11) and (b21) in | |
|---|---|
| binder (B1) and | crosslinking agent (B2) |
| Crosslinking agent (B2) and | or Binder (B1) |
| —SH | —C(O)—OH |
| —NH$_2$ | —C(O)—O—C(O)— |
| —OH | —NCO |
| | —NH—C(O)—OR |
| | —CH$_2$—OH |
| | —CH$_2$—O—CH$_3$ |
| | —NH—C(O)—CH(—C(O)OR)$_2$ |
| | —NH—C(O)—CH(—C(O)OR)(—C(O)—R) |
| | —NH—C(O)—NR$^1$R$^2$ |
| | =Si(OR)$_2$ |
| | —CH—CH$_2$ (epoxide) |
| —C(O)—OH | —CH—CH$_2$ (epoxide) |
| —O—C(O)—CR=CH$_2$ | —OH |
| —O—CR=CH$_2$ | —NH$_2$ |
| | —C(O)—CH$_2$—C(O)—R |
| | —CH=CH$_2$ |

Examples of suitable crosslinking agents (B2) are the abovementioned crosslinking agents (C2). These crosslinking agents (B2) are employed principally in one-component (1K) clearcoats.

Further examples of suitable crosslinking agents (B2) for this end use are polyepoxides (b21), particularly all known aliphatic and/or cycloaliphatic and/or aromatic polyepoxides, based for example on bisphenol A or bisphenol F. Examples of suitable polyepoxides (B2) also include the polyepoxides obtainable commercially under the designations Epikote® from Shell, Denacol® from Nagase Chemicals Ltd., Japan, such as Denacol EX-411 (pentaerythritol polyglycidyl ether), Denacol EX-321 (trimethylolpropane polyglycidyl ether), Denacol EX-512 (polyglycerol polyglycidyl ether), and Denacol EX-521 (polyglycerol polyglycidyl ether).

Further examples of suitable crosslinking agents (B2) for this end use are tris(alkoxycarbonylamino)triazines of the formula:

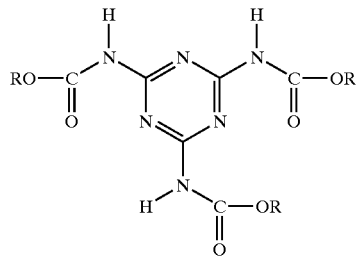

Examples of suitable tris (alkoxycarbonylamino) triazines (b21) are described in the patents U.S. Pat. No. 4,939,213, U.S. Pat. No. 5,084,541, and EP-A-0 624 577. In particular, the tris(methoxy-, tris(butoxy- and/or tris(2-ethylhexoxycarbonylamino)triazines are used.

The methyl butyl mixed esters, the butyl 2-ethylhexyl mixed esters, and the butyl esters are of advantage. They have the advantage over the straight methyl ester of better solubility in polymer melts, and also tend less toward crystallizing out.

Further examples of suitable crosslinking agents (B1) for this end use are the polyisocyanates (B2) described below whose free isocyanate groups are blocked with suitable blocking agents.

Examples of suitable blocking agents are the blocking agents known from the U.S. patent U.S. Pat. No. 4,444,954:

i) phenols such as phenol, cresol, xylenol, nitrophenol, chlorophenol, ethylphenol, t-butyl-phenol, hydroxybenzoic acid, esters of this acid, or 2,5-di-tert-butyl-4-hydroxytoluene;

ii) lactams, such as ε-caprolactam, δ-valerolactam, γ-butyrolactam or β-propiolactam;

iii) active methylenic compounds, such as diethyl malonate, dimethyl malonate, ethyl or methyl acetoacetate, or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazole, thiophenol, methylthiophenol or ethylthiophenol;

vi) acid amides such as acetoanilide, acetoanisidinamide, acrylamide, methacrylamide, acetamide, stearamide or benzamide;

vii) imides such as succinimide, phthalimide or maleimide;

viii) amines such as diphenylamine, phenylnaphthylamine, xylidine, N-phenylxylidine, carbazole, aniline, naphthylamine, butylamine, dibutylamine or butylphenylamine;

ix) imidazoles such as imidazole or 2-ethylimidazole;

x) ureas such as urea, thiourea, ethyleneurea, ethylenethiourea or 1,3-diphenylurea;

xi) carbamates such as phenyl N-phenylcarbamate or 2-oxazolidone;

xii) imines such as ethyleneimine;

xiii) oximes such as acetone oxime, formaldoxime, acetaldoxime, acetoxime, methyl ethyl ketoxime, diisobutyl ketoxime, diacetyl monoxime, benzophenone oxime or chlorohexanone oximes;

xiv) salts of sulfurous acid such as sodium bisulfite or potassium bisulfite;

xv) hydroxamic esters such as benzyl methacrylohydroxamate (BMH) or allyl methacrylohydroxamate; or xvi) substituted pyrazoles, ketoximes, imidazoles or triazoles; and also xvii) mixtures of these blocking agents, especially dimethylpyrazole and triazoles, malonates and acetoacetates, or dimethylpyrazol and succinamide.

Where the coating material (B) is designed as a two-component (2K) clearcoat material or multicomponent (3K, 4K) clearcoat material, crosslinking agents (B2) of higher reactivity, undergoing crosslinking reactions even at below 100° C., preferably below 80° C., may be used. Coating materials (B) of this kind will be chosen when the substrates cannot be subjected to high baking temperatures and/or when there is basically no need for high baking temperatures owing to the physical crosslinking of the basecoat material (A).

Examples of suitable reactive crosslinking agents (B2) are the polyepoxides described above.

Further examples of suitable reactive crosslinking agents (B2) are organic polyisocyanates, especially those known as paint polyisocyanates, containing free isocyanate groups attached to aliphatic, cycloaliphatic, araliphatic and/or aromatic moieties. It is preferred to use polyisocyanates (B2) containing from 2 to 5 isocyanate groups per molecule and having viscosities of from 100 to 10 000, preferably from 100 to 5 000 and—where manual mixing of the components is envisaged—in particular from 500 to 2000 mPas (at 23° C.). If desired, small amounts of organic solvent, preferably from 1 to 25% by weight based on polyisocyanate alone, may be added to the polyisocyanates (B2) in order to improve the ease of incorporation of the polyisocyanate (B2) and, where appropriate, to reduce its viscosity to a level within the abovementioned ranges. Examples of suitable solvent additives for the polyisocyanates (B2) are ethoxyethyl propionate, amyl methyl ketone, and butyl acetate. Furthermore, the polyisocyanates (B2) may have been subjected to conventional hydrophilic or hydrophobic modification.

Examples of suitable polyisocyanates (B2) are described, for example, in Methoden der organischen Chemie, Houben-Weyl, volume 14/2, 4th edition, Georg Thieme Verlag, Stuttgart 1963, pages 61 to 70, and by W. Siefken, Liebigs Annalen der Chemie, volume 562, pages 75 to 136. Suitable examples include the isocyanato-containing polyurethane prepolymers (B2) which may be prepared by reacting polyols with an excess of polyisocyanates and which are preferably of low viscosity.

Further examples of suitable polyisocyanates (b21) are polyisocyanates having isocyanurate, biuret, allophanate, iminooxadiazinedione, urethane, urea and/or uretdione groups. Polyisocyanates (B2) containing urethane groups, for example, are prepared by reacting some of the isocyanate groups with polyols, such as trimethylolpropane and glycerol, for example. Preference is given to using aliphatic or cycloaliphatic polyisocyanates (b21), especially hexamethylene diisocyanate, dimerized and trimerized hexamethylene diisocyanate, isophorone diisocyanate, dicyclohexylmethane 2,4'-diisocyanate, dicyclohexylmethane 4,4'-diisocyanate, diisocyanates derived from dimer fatty acids, as sold under the commercial designation DDI 1410 by Henkel and described in the patents WO 97/49745 and WO 97/49747, especially 2-heptyl-3,4-bis(9-isocyanatononyl)-1-pentylcyclohexane; or 1,2-, 1,4- or 1,3-bis (isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane, 1,8-diiso-cyanato-4-isocyanatomethyloctane, 1,7-diisocyanato-4-isocyanatomethylheptane or 1-isocyanato-2-(3-isocyanatopropyl)cyclohexane, or mixtures of these poly-isocyanates (B2).

Very particular preference is given to using mixtures of polyisocyanates (B2) based on hexamethylene diisocyanate and containing uretdione and/or isocyanurate and/or allophanate groups, as are formed by catalytic oligomerization of hexamethylene diisocyanate using appropriate catalysts.

The coating material (B) may further comprise customary and known solvents (B3). Examples of suitable solvents (B3) are the above-described solvents (C5).

The coating material (B) may further comprise customary and known additives (B4) in effective amounts. Examples of suitable additives (B4) are the above-described additives (C6). Where the coating material (B) is curable with actinic radication, it may also include customary and known photoinitiators as additives (B4).

The coating material (B) may be in the form of a solventborne spray paint.

Alternatively, the coating material (B) may be a powder clearcoat material. For this purpose, components (B1) and (B2) and also, where appropriate, (B3) and (B4) are selected so that the resulting powder clearcoat material (B) is solid and forms a film before curing.

Alternatively, the coating material (B) may also be a powder slurry clearcoat material. For this purpose, the components are required to meet the conditions specified above. In addition, they must be selected so that the powder slurry particles can be dispersed stably in water.

The composition of the coating materials (B) for use in accordance with the invention, i.e., the quantitative relationship of their components, may vary widely and is guided by the profile of properties of the clearcoat (B) and by its harmonization with the profile of properties of the clearcoat (C). Using his or her knowledge of the art, with or without the assistance of simple preliminary tests, and possibly using the prior art mentioned initially as a guideline, the skilled worker is able to determine suitable compositions.

The preparation of the coating material (B) from its components has no special features but instead takes place in a customary and known manner by mixing of the constituents in appropriate mixing units. In the case of spray paints (B), dissolvers are examples of units used for this purpose; in the case of powder clearcoat materials or powder slurry clearcoat materials (B), extruders and mills are employed.

The third essential component of the multicoat system of the invention is the basecoat (A).

The basecoat (A) is producible from a coating material (A), preferably an aqueous coating material (A), in particular an aqueous basecoat material (A), and is the color- and/or effect-imparting constituent of the multicoat system of the invention.

The aqueous basecoat material (A) used with particular preference in accordance with the invention conventionally comprises the following key components in dispersion in water:

(A1) at least one anionically and/or nonionically stabilized polyurethane and (A2) at least one color and/or effect pigment.

Examples of suitable color and/or effect pigments (A2) are metal flake pigments such as commercial aluminum bronzes, aluminum bronzes chromated in accordance with DE-A-36 36 183, and commercial stainless steel bronzes, and also nonmetallic effect pigments, such as pearlescent pigments and interference pigments, for example. Examples of suitable inorganic color pigments (A2) are titanium dioxide, iron oxides, Sicotrans yellow and carbon black. Examples of suitable organic color pigments (A2) are indanthrene blue, Cromophthal red, Irgazine orange and Heliogen green.

The coating material of the invention may further comprise organic and inorganic fillers (A3) in customary and known, effective amounts. Examples of suitable fillers are chalk, calcium sulfates, barium sulfate, silicates such as talc or kaolin, silicas, oxides such as aluminum hydroxide or magnesium hydroxide, or organic fillers such as textile fibers, cellulose fibers, polyethylene fibers or wood flour.

The coating material of the invention further comprises coatings additives (A4) in customary and known, effective amounts.

Examples of suitable additives (A4) are UV absorbers; free-radical scavengers; crosslinking catalysts, especially organometallic compounds, preferably organo-tin and/or organobismuth compounds or tertiary amines; reactive and inert nanoparticles such as are described, for example, in the patent EP-A-0 832 947, colloidal metal hydroxides containing blocked isocyanate groups, such as are described, for example, in the patent EP-A-0 872 500; slip additives; polymerization inhibitors; defoamers; adhesion promoters; leveling agents or film-forming auxiliaries, e.g. cellulose derivatives.

As additives (A4) it is possible in particular to use at least one rheology control additive. Examples of suitable rheology control additives (A4) are those known from the patents WO 94/22968, EP-A-0 276 501, EP-A-0 249 201, and WO 97/12945; crosslinked polymeric microparticles, such as are disclosed, for example, in EP-A-0 008 127; inorganic phyllosilicates such as aluminum magnesium silicates, sodium magnesium phyllosilicates and sodium magnesium fluorine lithium phyllosilicates of the montmorrilonite type; silicas such as Aerosils; or synthetic polymers containing ionic and/or associative groups, such as polyvinyl alcohol, poly(meth)acrylamide, poly(meth)acrylic acid, polyvinylpyrrolidone, styrene-maleic anhydride or ethylene-maleic anhydride copolymers and their derivatives or hydrophobically modified ethoxylated urethanes or polyacrylates. As rheology control additives (A4) it is referred to use polyurethanes and/or phyllosilicates.

If it is not to be cured by physical drying, the aqueous basecoat material (A) may further comprise at least one crosslinking agent (A5) in effective amounts.

Examples of suitable crosslinking agents (A5) are the above-described crosslinking agents (B2) suitable for use in one-component (1K) clearcoat materials. Where the aqueous basecoat material (A) is designed as a two-component (2K) or multicomponent (3K, 4K) clearcoat material, it comprises the above-described reactive crosslinking agents (B2).

Numerous examples of suitable anionically and/or non-ionically stabilized polyurethanes and also numerous examples of suitable compositions of aqueous basecoat materials (A) are disclosed in the patents EP-A-0 089 497 EP-A-0 256 540, EP-A-0 260 447, EP-A-0 297 576, WO 96/12747, EP-A-0 523 610, EP-A-0 228 003, EP-A-0 397 806, EP-A-0 547 417, EP-A-0 531 510, EP-A-0 581 211, EP-A-0 708 788, EP-A-0 593 454, DE-A-43 28 092, EP-A-0 299 148, EP-A-0 394 737, EP-A-0 590 484, EP-A-0 234 362, EP-A-0 234 361, EP-A-0 543 817, WO 95/14721, EP-A-0 521 928, EP-A-0 522 420, EP-A-0 522 419, EP-A-0 649 865, EP-A-0 536 712, EP-A-0 596 460, EP-A-0 596 461, EP-A-0 584 818, EP-A-0 669 356, EP-A-0 634 431, EP-A-0 678 536, EP-A-0 354 261, EP-A-0 424 705, WO 97/49745, WO 97/49747, and EP-A-0 401 565.

In terms of its method, the preparation of aqueous basecoat materials (A) has no special features but instead takes place in accordance with the customary and known methods by mixing of the components in appropriate mixing units such as dissolvers.

The multicoat system of the invention may be produced by any of a very wide variety of techniques. It is of advantage to produce it in accordance with the process of the invention.

The process of the invention starts from the substrate that is to be coated. The substrate may consist of metal, wood, plastic, glass or paper or may be a composite of these materials. The substrates in question preferably comprise automobile body parts, industrial components, or metal containers.

The substrate may have been provided with a primer coat. In the case of plastics, this coat is what is known as a water-based primer coat which is cured before the basecoat material (A), especially the aqueous basecoat material (A), is applied. In the case of metals, especially automobile body parts, the primer systems in question comprise customary and known, cured electrocoat materials which are overcoated with a primer-surfacer and baked.

In the procedure according to the invention, the basecoat material (A) is applied to the surface of the substrate in a step (I) and subjected to interim drying (step II), but without being cured.

In a step (III), a first clearcoat material (B) which subsequently forms the intermediate coat is applied to the surface of the basecoat film (A).

In step (IV), the films (A) and (B) are cured together (wet-on-wet technique). Depending on its composition, the film (B) may be cured thermally and/or with actinic radiation. As far as thermal curing is concerned, the baking temperature is guided in particular by whether the coating materials (A) and (B) are one-component (1K) or two-component (2K) or multicomponent (3K, 4K) systems. In the case of one-component (1K) systems, baking temperatures above 120° C. are generally employed. In the case of two-component (2K) or multicomponent (3K, 4K) systems, the baking temperatures are normally below 100° C., in particular below 80° C.

In the invention, in step (V) the clearcoat film (C), materially different from the clearcoat film (B) is applied to the latter's surface, and in step (VI) it is cured. In this case, baking temperatures of from 120 to 150° C. are normally applied.

Alternatively, still in accordance with the invention, the second clearcoat film (C) may be applied wet-on-wet before being baked with the first clearcoat film (B) and the basecoat film (A).

In the context of the process of the invention, the coating materials (A), (B) and (C) may be applied to the substrates by means of customary application methods, such as spraying, knife-coating, brushing, flow coating, dipping or rolling, for example. Curing of the individual films may be carried out using the customary and known methods such as heating in a full scale oven, irradiation with IR lamps, and, where appropriate, with UV lamps as well.

Within the multicoat system of the invention, the thickness of the individual coats (A), (B) and (C) may vary widely. In accordance with the invention, however, it is of advantage if the basecoat (A) has a thickness of from 5 to 25 $\mu$m, in particular from 7 to 15 $\mu$m, and the two clearcoats (B) and (C) have a thickness overall of from 15 to 120 $\mu$m, preferably from 40 to 80 $\mu$m and in particular from 60 to 70 $\mu$m. The ratio of the coat thicknesses may vary widely; on economic grounds, however, it is advantageous for the clearcoat (B) to be the thicker of the two coats.

The multicoat system of the invention has outstanding optical, mechanical and chemical properties. For instance, it is free of any surface defects such as shrinkage (wrinkling). It is of outstanding transparency and scratch resistance. Delamination owing to deficient intercoat adhesion is not observed. The etch resistance is outstanding. Accordingly, the coating material (C) for use in accordance with the invention is outstandingly suitable for enhancing all conventional clearcoat systems without any need for the customer to make substantial changes to the coating lines. This constitutes a further particular advantage of the multicoat systems of the invention.

EXAMPLES

Preparation Example 1

The Preparation of a Crosslinking Agent

In a 4 l stainless steel reactor with stirrer, reflux condenser, thermometer, oil heating and a feed vessel for the blocking agent, 41.76 parts by weight of Vestanat$^R$ 1890 (isophorone diisocyanate-based isocyanurate from Creanova) and 20.76 parts by weight of solvent naphtha were weighed in and heated to 50° C. Over the course of four hours, 23.49 parts by weight of diethyl malonate, 5.81 parts by weight of ethyl acetoacetate and 0.14 part by weight of catalyst solution (sodium ethylhexanoate) were metered in at a uniform rate. After the end of the feed, a further 0.14 part by weight of catalyst solution were added. Thereafter the temperature was raised to 80° C. When an isocyanate equivalent weight of from 5900 to 6800 had been reached, 0.9 part by weight of 1,4-cyclohexyldimethanol were added at 80° C. over 30 minutes with stirring. When an isocyanate equivalent weight of $\geq$13000 had been reached, 5 parts by weight of n-butanol were added. The temperature was lowered to 50° C. and the resulting blocked polyisocyanate was diluted with 2 parts by weight of n-butanol to a theoretical solids content of 68% by weight. The blocked polyisocyanate thus obtained had a solids content of 74.5% by weight (one hour; 130° C.) and an original viscosity of 41.6 dpas.

Preparation Example 2

The Preparation of a Polyacrylate

In a laboratory reactor with a useful volume of 4 l, equipped with a stirrer, two dropping funnels for the monomer mixture and initiator solution, respectively, nitrogen inlet pipe, thermometer and reflux condenser, 720 g of an aromatic hydrocarbon fraction with a boiling range of 158–172° C. were weighed in. The solvent was heated to 140° C. When it had reached 140° C., a monomer mixture of 427.5 g of n-butyl acrylate, 180 g of n-butyl methacrylate, 450 g of styrene, 255 g of hydroxyethyl acrylate, 165 g of 4-hydroxybutyl acrylate and 22.5 g of acrylic acid were metered into the reactor at a uniform rate over the course of 4 hours and an initiator solution of 120 g of t-butyl perethylhexanoate in 90 g of the aromatic solvent described above was metered into the reactor at a uniform rate over the course of 4.5 hours. The metered additions of the monomer mixture and of the initiator solution were commenced simultaneously. After the end of the initiator feed, the reaction mixture was held at 140° C. for two hours more and then cooled. The resulting polymer solution had a solids content of 60%, determined in a full scale oven at 130° C. for 1 h, an acid number of 13 mg KOH/g, an OH number of 116 mg KOH/g, a glass transition temperature Tg of 3.23° C., and a viscosity of 9 dPas (measured on the 60% solution of the polymer in the aromatic solvent described above, using an ICI cone and plate viscometer at 23° C.).

Example 1

The Preparation of an Inventive One-component Clearcoat Material

An inventive one-component clearcoat material was prepared by mixing the constituents listed in table 1.

TABLE 1

Composition of the inventive one-component clearcoat material

| Constituents | Example 1 (Parts by weight) |
|---|---|
| Polyacrylate from preparation example 2 | 43.4 |
| Crosslinking agent from preparation example 1 | 9.0 |
| Commercial butanol-etherified melamine-formaldehyde resin (60% in butanol/xylene) | 16.0 |
| Setalux ® C91756 (commercial thixotropic agent from Akzo) | 13.5 |
| Substituted hydroxyphenyltriazine (65% in xylene) (Cyagard ® 1164 L) | 0.6 |
| Amino ether-modified 2,2,6,6-tetra-methylpiperidinyl ester (Tinuvin ® 123 from Ciba) | 0.8 |
| Byk ® 390 (Byk Chemie) | 0.05 |
| Byk ® 310 (Byk Chemie) | 0.15 |
| Tego ® LAG 502 | 0.2 |
| Butanol | 11.4 |
| Solventnaphtha ® | 2.5 |
| Xylene | 0.9 |
| Butyl diglycol acetate | 1.5 |
| TOTAL | 100 |

The clearcoat material of example 1 had an efflux time of 46 s in the DIN 4 cup at 21° C. For application it was adjusted to an efflux time of 28 s using 8 parts by weight of a diluent (organic solvent mixture).

Example 2
The Production of an Inventive Multicoat System ML

To produce the test panels, an electrocoat material (dry film thickness 22 μm) and a water-based primer-surfacer (FU63-9400 from BASF Coatings AG) were applied in succession and baked (dry film thickness 30 μm). The electrocoat material was baked at 170° C. for 20 minutes and the primer-surfacer at 160° C. for 20 minutes. Then a blue aqueous basecoat material (Wasser-Percolor-Basis-lack FW 05-513P from BASF Coatings AG) was applied with a film thickness of 15–18 μm and flashed off at 80° C. for 10 minutes.

Subsequently, for example 2, the one-component clearcoat material of example 1 (cf. table 1) was applied wet-on-wet and was baked at 135° C. for 30 minutes so as to give dry film thicknesses of 35 μm.

The resulting test panels, without being sanded, were overcoated with the overcoating clearcoat material URE-CLEAR® from BASF Coatings AG (spray viscosity 25 s in the DIN 4 efflux cup at 22° C.). The resulting clearcoat films were baked at 140° C. for 20 minutes so as to give dry film thicknesses of 20 μm.

The adhesion of the inventive multicoat system ML of example 2 was determined in accordance with the cross-cut test to DIN 53151 (2 mm) [rating 0 to 5] after storage at room temperature for 24 hours. There was no delamination: rating GT0.

Furthermore, the adhesion properties of the multicoat system ML of the invention from example 2 were determined by means of the cross-cut test following exposure to condensation. The results are given in table 2. They underscore the adhesive strength of the multicoat system ML of the invention.

TABLE 2

Constant condensation climate test (KK test)[a] and adhesion properties of the inventive multicoat system ML

| | Example 2 |
|---|---|
| Adhesion according to the cross-cut test[b] | GT1 |

[a]Customary method of evaluating the resistance of paint materials to long-term moisture exposure (240 hours, 100% relative humidity, 40° C., details in test specification MKK0001A, issue A/14.05.1996, available from BASF Coatings AG). The evaluation is made one hour after the end of condensation exposure.
[b]Cross-cut to DIN 53151 (2 mm) after 240 hours of SKK and 24 hours of regeneration: rating: 0 to 5: 0 = best score; 5 = worst score.

The scratch resistance of the inventive multicoat system ML on the test panels was assessed using the BASF brush test described in FIG. 2 on page 28 of the article by P. Betz and A. Bartelt, Progress in Organic Coatings, 22 (1993), pages 27–37, albeit with a modification in respect of the weight used (2 000 g instead of the 280 g specified therein), assessment taking place as follows:

In the test, the film surface was damaged with a woven mesh which was loaded with a weight. The woven mesh and the film surface were wetted generously with a laundry detergent solution. By means of a motor drive, the test panel was moved backward and forward under the woven mesh in reciprocating movements.

The test element was an eraser (4.5×2.0 cm, broadside perpendicular to the direction of scratching) around which was stretched a woven nylon mesh (No. 11, 31 μm mesh size, Tg 50° C.). The applied weight was 2 000 g.

Prior to each test, the woven mesh was replaced, with the running direction of the woven meshes parallel to the direction of scratching. Using a pipette, about 1 ml of a freshly stirred 0.25% Persil solution was applied before the eraser. The speed of rotation of the motor was set so as to perform 80 double strokes within a period of 80 s. After the test, the remaining detergent liquid was rinsed off with cold tap water and the test panels were blown dry with compressed air. Measurements were made of the gloss (20°) to DIN 67530 before and after damage (measurement direction perpendicular to the direction of scratching).

Prior to damaging, the test panels had a gloss of 83.7, which as a result of the damage decreased only by dgloss 10.1. After a period of 2 hours at 40° C., the dgloss was only 7.0, after a period of 2 hours at 60° C. only 6.0. This underscores the outstanding scratch resistance and the very good reflow behavior of the inventive multicoat system.

In addition, the scratch resistance was determined by the sand test. For this purpose, the film surface was loaded with sand (20 g of quartz silver sand, 1.5–2.0 mm). The sand was placed in a beaker (with its base cut off in a planar fashion) which was firmly fastened on the test panel. The test panels used were the same as those described in the brush test above. Using a motor drive, the panel with the beaker and the sand was set in shaking movements. The movement of the loose sand damaged the film surface (100 double strokes in 20 s). Following sand exposure, the test area was cleaned to remove abraded material, wiped off carefully under a jet of cold water, and then dried with compressed air. Measurements were made of the gloss to DIN 67530 before and after damage.

Prior to damaging, the test panels had a gloss of 83.7, which as a result of the damage decreased only by dgloss 19.1. After a period of 2 hours at 40° C., the dgloss was only 17.8, after a period of 2 hours at 60° C. only 15.9. This underscores the outstanding scratch resistance and the very good reflow behavior of the inventive multicoat system.

The chemical resistance was determined by the BART (BASF ACID RESISTANCE TEST). It was used to determine the resistance of film surfaces to acids, alkalis, and water drops. The multicoat system ML after baking was subjected in a gradient oven to further temperature loads (30 min at 40° C., 50° C., 60° C., and 70° C.). Beforehand the test substances (1%, 10%, and 36% sulfuric acid; 6% sulfurous acid; 10% hydrochloric acid; 5% sodium hydroxide solution; DI (deionized) water—1, 2, 3 and 4 drops of each) were applied in a defined manner using a volumetric pipette. Following exposure to the substances, they were removed under running water and the damage was assessed visually after 24 h in accordance with the given scale:

| Rating | Appearance |
|---|---|
| 0 | no defect |
| 1 | slight marking |
| 2 | marking/matting/no softening |
| 3 | marking/matting/color change/softening |
| 4 | cracks/incipient etching |
| 5 | clearcoat removed |

Each individual mark (spot) was evaluated and the result was set down in a ratings total for one temperature. The scores which resulted were as follows; total at 40° C.: 0; total at 50° C.: 3; total at 60° C.: 7; and total at 70° C.: 19. The values demonstrate the high chemical resistance of the inventive multicoat system ML.

What is claimed is:
1. A scratch-resistant multicoat paint system on a primed or unprimed substrate, comprising above one another in this order

(A) a basecoat,
(B) a first clearcoat as intermediate coat, and
(C) a second clearcoat as the topmost coat, wherein the second clearcoat comprises a reaction product comprising
   (C1) at least one of an oligomer and a polymer comprising at least one pendant group comprising at least one allophanate group and optionally at least one carbamate group of the formulae:

—O—(CO)—NR$_2$—O—(CO)—NH—(CO)—NH$_2$ and
   (C2) at least one crosslinking agent comprising at least two functional groups which undergo crosslinking reactions with the pendant group.

2. A process for producing a scratch-resistant multicoat paint system, comprising:
   (I) applying a basecoat material to a primed or unprimed substrate,
   (II) carrying out interim drying of the applied basecoat material,
   (III) applying a first clearcoat material, and
   (IV) together curing the basecoat and the first clearcoat using a wet-on-wet technique,
   (V) applying a materially different second clearcoat comprising
      (C1) at least one of an oligomer and a polymer comprising at least one pendant group comprising at least one allophanate group and optionally at least one carbamate group of the formulae:

—O—(CO)—NH$_2$—O—(CO)—NH—(CO)—NH$_2$ and
      (C2) at least one crosslinking agent comprising at least two functional groups which undergo crosslinking reactions with the pendant group; and
   (VI) curing.

3. A process for producing a scratch-resistant multicoat paint system, comprising:
   (I) applying a basecoat material to a primed or unprimed substrate,
   (II) carrying out interim drying of the applied basecoat, and
   (III) applying a first clearcoat material,
   (IV) carrying out interim drying of the first clearcoat material, and
   (V) applying a materially different second clearcoat film, comprising
      (C1) at least one an oligomer and a polymer comprising at least one pendant group comprising at least one allophanate group and optionally at least one carbamate group of the formulae

—O—(CO)—NH$_2$—O—(CO)—NH—(CO)—NH$_2$ and
      (C2) at least one crosslinking agent comprising at least two functional groups which undergo crosslinking reactions with the pendant group;
   (VI) baking the basecoat, the first clearcoat, and the second clearcoat together.

4. The scratch-resistant multicoat paint system of claim 1, wherein at least one of the oligomer and the polymer comprise an addition copolymer of ethylenically unsaturated monomers.

5. The scratch-resistant multicoat paint system of claim 4, wherein at least one of the ethylenically unsaturated monomers comprises at least one pendant group comprising at least one of a carbamate group and an allophanate group.

6. The scratch-resistant multicoat paint system of claim 1, wherein the pendant group is reacted onto at least one of the oligomers and the polymers by a polymer-analogous reaction.

7. The scratch-resistant multicoat paint system of claim 1, wherein the crosslinking agent comprises at least one of an amino resin, a polysiloxane, a compound comprising at least one cyclic carbonate group, and a polyanhydride.

8. The scratch-resistant multicoat paint system of claim 1, wherein the second clearcoat further comprises a crosslinking catalyst comprising at least one of a blocked and an unblocked acid.

9. The scratch-resistant multicoat paint system of claim 1, wherein the second clearcoat further comprises at least one compound comprising at least one epoxide group.

10. The scratch-resistant multicoat paint system of claim 9, wherein the compound comprises a poly(meth)acrylate comprising pendant epoxide groups.

11. The scratch-resistant multicoat paint system of claim 1, wherein the first clearcoat comprises a reaction product comprising at least one binder comprising functional groups, and at least one crosslinking agent comprising functional groups, wherein the functional groups of the binder undergo crosslinking reactions with the functional groups of the crosslinking agent.

12. The scratch-resistant multicoat paint system of claim 11, wherein the functional groups of the binder comprise at least one of thio, amino, hydroxyl, carboxyl, epoxy, and (meth)acrylate; and the functional groups of the crosslinking agent comprise at least one of anhydride, carboxyl, epoxy, isocyanate, blocked isocyanate, urethane, methylol, methylol ether, siloxane, amino, hydroxyl, beta-hydroxyalkylamide, and ethylenically unsaturated groups crosslinkable with actinic radiation.

13. The scratch-resistant multicoat paint system of claim 1, wherein the first clearcoat comprises one of a one-component clearcoat material, a two-component clearcoat material, and a multicomponent clearcoat material, and wherein the first clearcoat material is one of a powder clearcoat material and a powder slurry clearcoat material.

14. The scratch-resistant multicoat paint system of claim 1, wherein the first clearcoat is curable by at least one of physically, thermally, and with actinic radiation.

15. A substrate comprising the scratch-resistant multicoat paint system of claim 1.

16. The scratch-resistant multicoat paint system of claim 1 further characterized by at least two of:
   a. at least one of the oligomer and the polymer comprises an addition copolymer of ethylenically unsaturated monomers;
   b. the pendant group is reacted onto at least one of the oligomers and the polymers by a polymer-analogous reaction;
   c. the crosslinking agent comprises at least one of an amino resin, a polysiloxane, a compound comprising at least one cyclic carbonate group, and a polyanhydride;
   d. the second clearcoat further comprises a crosslinking catalyst comprising at least one of a blocked and an unblocked acid;
   e. the second clearcoat further comprises at least one compound comprising at least one epoxide group;
   f. the second clearcoat further comprises a poly(meth)acrylate comprising pendant epoxide groups;

g. the first clearcoat comprises a reaction product comprising at least one binder comprising functional groups, and at least one crosslinking agent comprising functional groups, wherein the functional groups of the binder undergo crosslinking reactions with the functional groups of the crosslinking agent;

h. the first clearcoat comprises one of a one-component clearcoat material, a two-component clearcoat material, and a multicomponent clearcoat material;

i. the first clearcoat material is one of a powder clearcoat material and a powder slurry clearcoat material; and j. the first clearcoat is curable by at least one of physically, thermally, and with actinic radiation.

17. The scratch-resistant multicoat paint system of claim 16 further characterized by at least one of:

a. the at least one of the ethylenically unsaturated monomers comprises at least one pendant group comprising at least one allophanate group and optionally at least one carbamate group; and b. the functional groups of the binder comprise at least one of thio, amino, hydroxyl, carboxyl, epoxy, and (meth)acrylate; and the functional groups of the crosslinking agent comprise at least one of anhydride, carboxyl, epoxy, isocyanate, blocked isocyanate, urethane, methylol, methylol ether, siloxane, amino, hydroxyl, beta-hydroxyalkylamide, and ethylenically unsaturated groups crosslinkable with actinic radiation.

18. A substrate comprising the scratch-resistant multicoat paint system of claim 16.

19. A substrate comprising the scratch-resistant multicoat paint system of claim 17.

20. The process of claim 2 further characterized by at least one of:

a. at least one of the oligomer and the polymer comprises an addition copolymer of ethylenically unsaturated monomers;

b. the pendant group is reacted onto at least one of the oligomers and the polymers by a polymer-analogous reaction;

c. the crosslinking agent comprises at least one of an amino resin, a polysiloxane, a compound comprising at least one cyclic carbonate group, and a polyanhydride;

d. the second clearcoat further comprises a crosslinking catalyst comprising at least one of a blocked and an unblocked acid;

e. the second clearcoat further comprises at least one compound comprising at least one epoxide group;

f. the second clearcoat further comprises a poly(meth)acrylate comprising pendant epoxide groups;

g. the first clearcoat comprises a reaction product comprising at least one binder comprising functional groups, and at least one crosslinking agent comprising functional groups, wherein the functional groups of the binder undergo crosslinking reactions with the functional groups of the crosslinking agent;

h. the first clearcoat comprises one of a one-component clearcoat material, a two-component clearcoat material and a multicomponent clearcoat material;

i. the first clearcoat material is one of a powder clearcoat material and a powder slurry clearcoat material; and j. the first clearcoat is curable by at least one of physically, thermally, and with actinic radiation.

21. The process of claim 20 further characterized by at least one of:

a. the at least one of the ethylenically unsaturated monomers comprises at least one pendant group comprising at least one allophanate group and optionally at least one carbamate group; and b. the functional groups of the binder comprise at least one of thio, amino, hydroxyl, carboxyl, epoxy, and (meth)acrylate; and the functional groups of the crosslinking agent comprise at least one of anhydride, carboxyl, epoxy, isocyanate, blocked isocyanate, urethane, methylol, methylol ether, siloxane, amino, hydroxyl, beta-hydroxyalkylamide, and ethylenically unsaturated groups crosslinkable with actinic radiation.

22. A substrate comprising the scratch-resistant multicoat paint system produced by the process of claim 2.

23. A substrate comprising the scratch-resistant multicoat paint system produced by the process of claim 20.

24. A substrate comprising the scratch-resistant multicoat paint system produced by the process of claim 21.

25. The process of claim 3 further characterized by at least one of:

a. at least one of the oligomer and the polymer comprises an addition copolymer of ethylenically unsaturated monomers;

b. the pendant group is reacted onto at least one of the oligomers and the polymers by a polymer-analogous reaction;

c. the crosslinking agent comprises at least one of an amino resin, a polysiloxane, a compound comprising at least one cyclic carbonate group, and a polyanhydride;

d. the second clearcoat further comprises a crosslinking catalyst comprising at least one of a blocked and an unblocked acid;

e. the second clearcoat further comprises at least one compound comprising at least one epoxide group;

f. the second clearcoat further comprises a poly(meth)acrylate comprising pendant epoxide groups;

g. the first clearcoat comprises a reaction product comprising at least one binder comprising functional groups, and at least one crosslinking agent comprising functional groups, wherein the functional groups of the binder undergo crosslinking reactions with the functional groups of the crosslinking agent;

h. the first clearcoat comprises one of a one-component clearcoat material, a two-component clearcoat material, and a multicomponent clearcoat material;

i. the first clearcoat material is one of a powder clearcoat material and a powder slurry clearcoat material; and j. the first clearcoat is curable by at least one of physically, thermally, and with actinic radiation.

26. The process of claim 25 further characterized by at least one of:

a. the at least one of the ethylenically unsaturated monomers comprises at least one pendant group comprising at least one of a carbamate group and an allophanate group; and b. the functional groups of the binder comprise at least one of thio, amino, hydroxyl, carboxyl, epoxy, and (meth)acrylate; and the functional groups of the crosslinking agent comprise at least one of anhydride, carboxyl, epoxy, isocyanate, blocked isocyanate, urethane, methylol, methylol ether, siloxane, amino, hydroxyl, beta-hydroxyalkylamide, and ethylenically unsaturated groups crosslinkable with actinic radiation.

27. A substrate comprising the scratch-resistant multicoat paint system produced by the process of claim 3.

28. A substrate comprising the scratch-resistant multicoat paint system produced by the process of claim 25.

29. A substrate comprising the scratch-resistant multicoat paint system produced by the process of claim 26.

* * * * *